Figure 1:
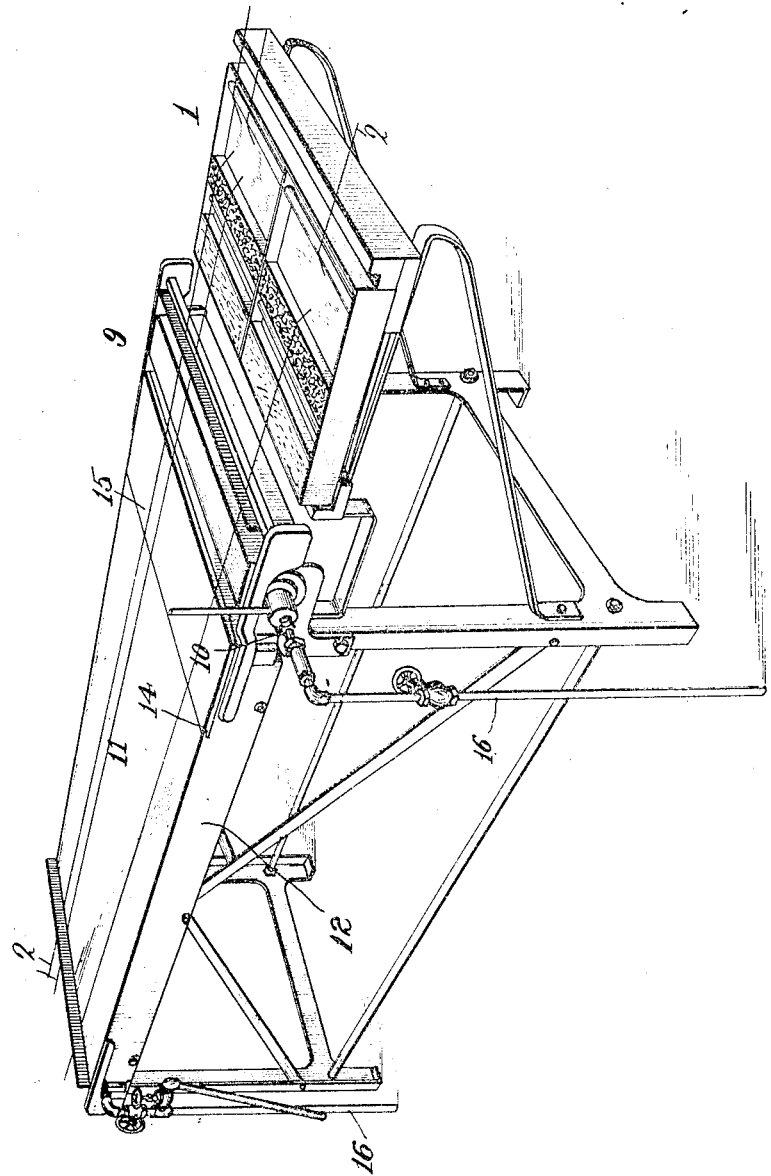

E. POHL.
APPARATUS FOR LUSTERING AND FINISHING SILK FILAMENTS.
APPLICATION FILED JUNE 2, 1908.

916,367.

Patented Mar. 23, 1909.
2 SHEETS—SHEET 1.

WITNESSES:

INVENTOR
Edward Pohl
BY
HIS ATTORNEYS

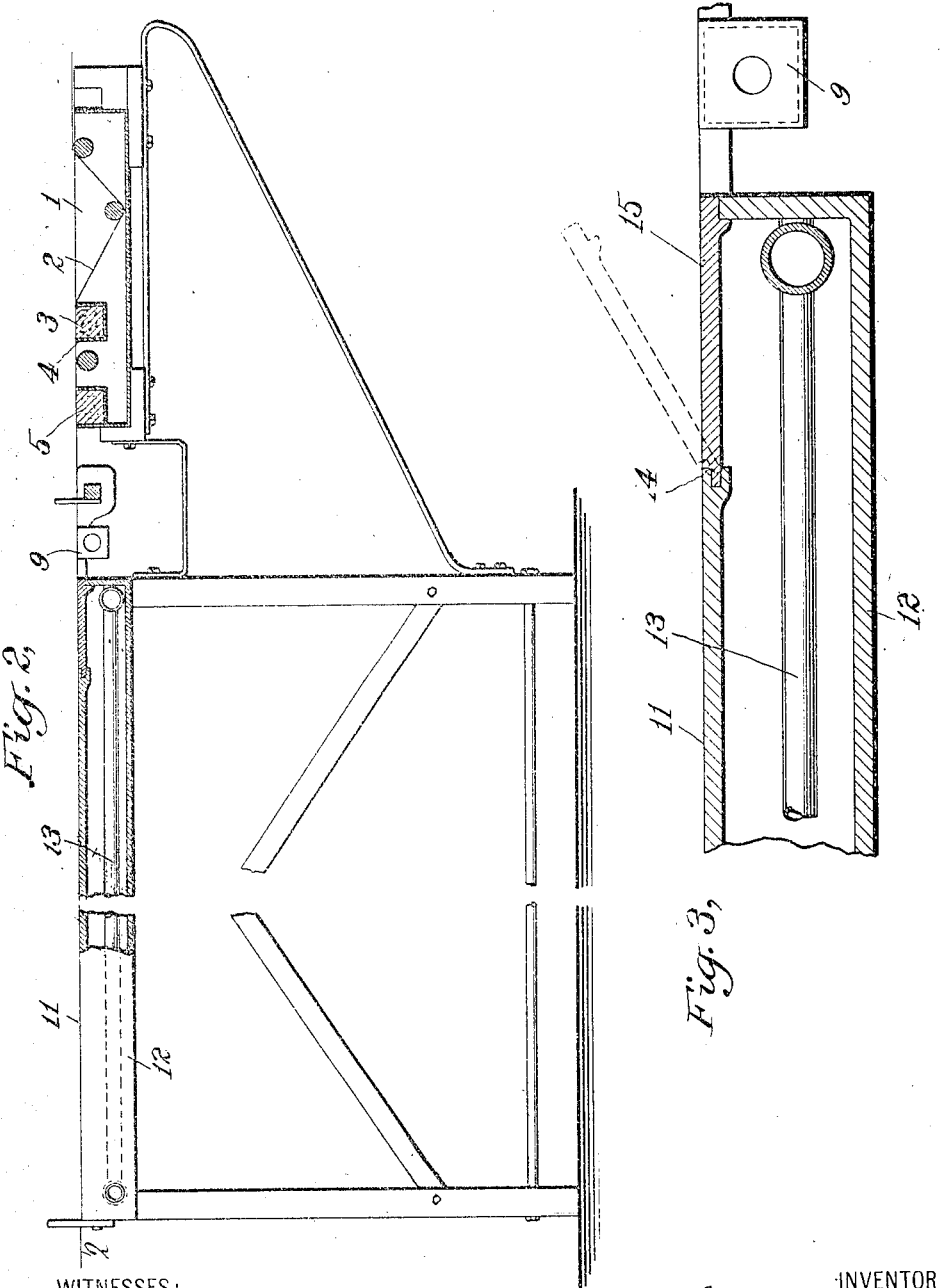

UNITED STATES PATENT OFFICE.

EDWARD POHL, OF NEW YORK, N. Y.

APPARATUS FOR LUSTERING AND FINISHING SILK FILAMENTS.

No. 916,367.     Specification of Letters Patent.     Patented March 23, 1909.

Original application filed October 14, 1906, Serial No. 282,703. Divided and this application filed June 2, 1908.
Serial No. 436,286.

*To all whom it may concern:*

Be it known that I, EDWARD POHL, a subject of the Crown of Austria, and a resident of New York, county and State of New York, have invented certain new and useful Improvements in Apparatus for Lustering and Finishing Silk Filaments, of which the following is a specification, reference being had to the accompanying drawings, forming a part thereof.

In apparatus of the class to which this invention relates, means are provided for immersing silk filaments in a bath containing a suitable liquid, and for then drying and lustering the filaments by carrying them from the bath over a heated surface.

In operating machines of this character, I have found that a certain quantity of solution carried by the filaments becomes deposited upon the approach end of the heated surface where it cakes and dries, thereby seriously interfering with the efficiency of the apparatus, and tending to injure the filaments by dirtying them.

To cleanse the approach end of the heated surface, it has been necessary heretofore to remove the threads from contact with the heated surface in order that access may be had to the heated surface. This necessarily takes considerable time and entails serious loss by reason thereof. This is especially true because of the fact that the surface becomes quite quickly fouled, and hence the cleaning should be attended to frequently. The result in operation has been a tendency on the part of the operator toward running the machine for some time after it has become fouled to the injury of the resulting product.

It is the purpose of this invention to provide a simple means whereby the approach end of the said heated contact surface may be readily and quickly cleaned with a minimum expenditure of time and trouble. To this end I provide the heated body containing the contact surface with a part on the approach end thereof removable. Preferably I provide a recess at the approach end of the heated body and fit a removable plate thereto the surface of the said plate and the remainder of the heated contact surface being in substantial register during the normal operation of the device. When the said removable portion becomes fouled, it may be quickly removed and replaced with a clean portion, the fouled removable part being then cleaned at leisure, or the fouled part may be temporarily removed and quickly cleaned without it becoming necessary to remove the threads at such time, and then replaced with a minimum loss of time.

In order that my invention may be fully understood, I will describe an apparatus constituting an embodiment thereof and will then point out the novel features in claims.

In the drawings: Figure 1 is a view in perspective of an apparatus embodying my invention. Fig. 2 is a view in partial side elevation and partial central vertical longitudinal section therethrough. Fig. 3 is a view in partial vertical section through the device at and near the approach end of the heated contact member, the parts being upon a larger scale than that in the other figures.

In the device herein illustrated, a bath 1 contains the required liquid through which silk filaments 2 are drawn. The filaments then pass over a sponge 3 arranged in a perforated trough 4 and over a felt pad 5 suitably supported, whereby the superfluous fluid carried up by the filaments is returned to the bath or suitably absorbed. Thence the filaments pass over a polygonal member 9 revolubly mounted upon trunnions 10 comprising branch pipes of a steam heating system 16. The member 9 has a plurality of flat sides arranged at equal distances from its axis of rotation, whereby successive sides may be presented for engagement with the filaments as may be desired. This polygonal member is shown and described in detail and is claimed in U. S. Patent No. 808402 which was issued to me on Dec. 26th., 1905. The said member is hollow, being arranged to receive steam from the steam heating system whereby the said member will be heated. From this point the filaments pass to a heated contact surface 11, here shown as constituting the upper surface of a heated table 12, commonly known as a "steam table." The said steam table 12 is suitably heated by means of radiating pipes 13, also included in the aforesaid steam heating system 16. At its approach end, the steam table is provided with a recess 14 in which is fitted a separate removable portion 15, the said removable portion 15 being secured in position by any suitable means and readily removable when desired for the purpose above set forth. In the construction here shown, the part 15 may be removed by merely lifting or sliding it from place.

I have found in practice that it is only at the approach end that the steam table becomes badly fouled and requires constant attention so that by making the approach end removable whereby the same may be readily cleansed, the machine may be kept in proper condition for treating filaments with a minimum loss of time due to stopping the machine for such cleansing purposes.

As above stated, the removable portion 15 may be removed, cleansed and replaced, or an extra part may be provided which may be quickly substituted for the fouled part when the same is moved and such fouled part then cleansed at leisure.

What I claim is:

1. In a machine for finishing and lustering textile filaments, a heated body having a contact surface for the threads, and having a part thereof which goes to make up the said surface at the approach end thereof removable, substantially as described.

2. In a machine for finishing and lustering textile filaments, a heated body having a stationary contact surface for the threads, and provided also at its approach end with a removable contact surface, said stationary and removable surfaces retained in register during the normal operation of the device, whereby the two said surfaces are at such times substantially continuous.

3. In combination, a means for treating the threads with a finishing solution, and a heated metallic body over which the threads are adapted to be drawn after leaving said means, the approach end of the surface portion of said body being removable.

4. In a combination, a means for treating the threads with a finishing solution, a heated metallic body over which said threads are adapted to be drawn after leaving said means, said body having a recess in its approach end, and a removable metallic plate arranged in said recess.

5. In a machine for finishing and lustering textile filaments and the like, the combination of two heated bodies arranged in alinement with each other, the top surface of one being approximately flat, and a plate removably arranged on the other and having its top surface approximately in the plane of the top surface of said first-named body, substantially as described.

EDWARD POHL.

Witnesses:
D. HOWARD HAYWOOD,
F. GRAVES.